July 5, 1955

H. WEBER 2,712,344

PRIVATE CARS FOR PREPARING FULL-LENGTH RESTING-PLACES

Filed July 12, 1950

3 Sheets-Sheet 1

INVENTOR
HENRY WEBER

BY *Richards & Geier*

ATTORNEYS

July 5, 1955
H. WEBER
2,712,344
PRIVATE CARS FOR PREPARING FULL-LENGTH RESTING-PLACES
Filed July 12, 1950
3 Sheets-Sheet 2
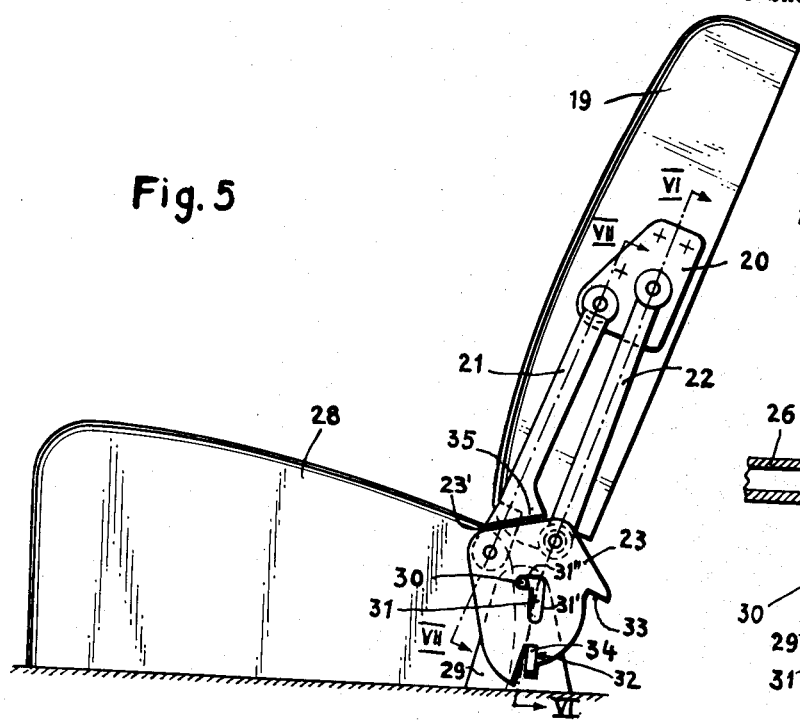
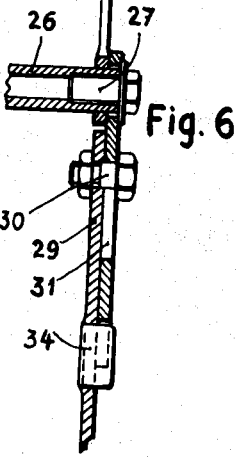
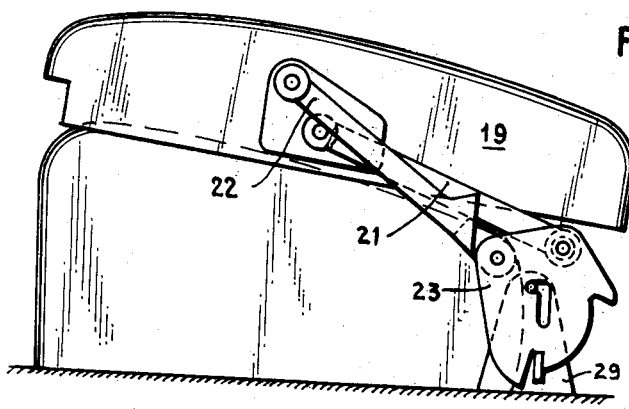
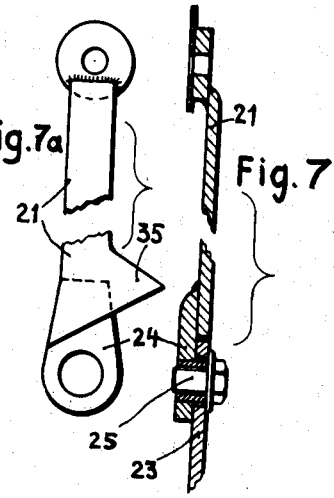
INVENTOR.
Henry Weber
BY
ATTORNEYS July 5, 1955

H. WEBER 2,712,344

PRIVATE CARS FOR PREPARING FULL-LENGTH RESTING-PLACES

Filed July 12, 1950

3 Sheets-Sheet 3

INVENTOR.
Henry Weber
BY
Richards & Geier
ATTORNEYS

United States Patent Office 2,712,344
Patented July 5, 1955

2,712,344
PRIVATE CARS FOR PREPARING FULL-LENGTH RESTING-PLACES

Henry Weber, Zurich, Switzerland

Application July 12, 1950, Serial No. 173,283
Claims priority, application Switzerland July 14, 1949
6 Claims. (Cl. 155—7)

It is known to provide private cars with arrangements for turning the backs of the seats entirely or partly to the rear, so that resting-places can be formed. In order to be able to drive the car after resting-places have been formed, for instance for transporting sick persons, only half of the back—namely the half not used by the driver—could be turned over towards the rear; for if the whole back was turned over the car could no longer be driven, since it is no longer practically possible to steer the car without a support for the driver's back.

The improvement in accordance with the present invention eliminates this drawback; it is characterized in that the back of the seat is fixed in such a way that it can, as desired, be adopted as a seat-back, or as part of a resting-place when laid right back, or as a seat when laid over onto the front seat, and in that a device is provided which serves as a substitute for supporting the driver's back when the seat-back has been laid over.

Figure 1:
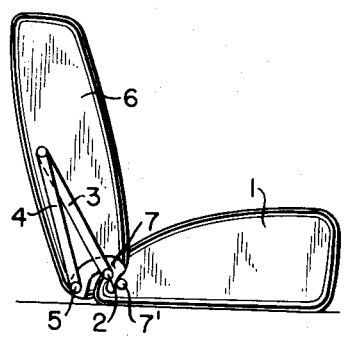
Figure 2:
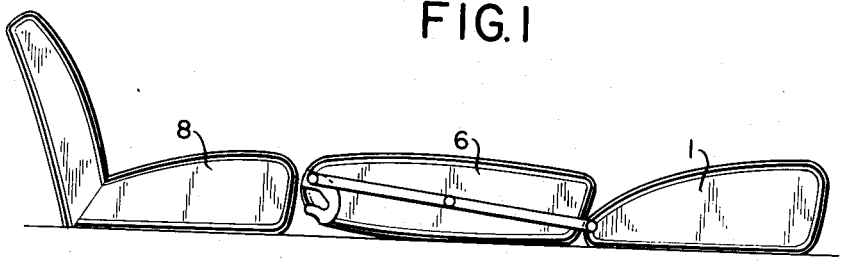
Figure 3:
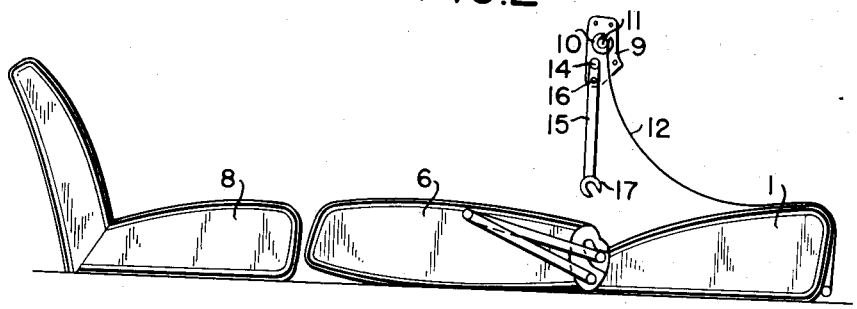
Figure 4:
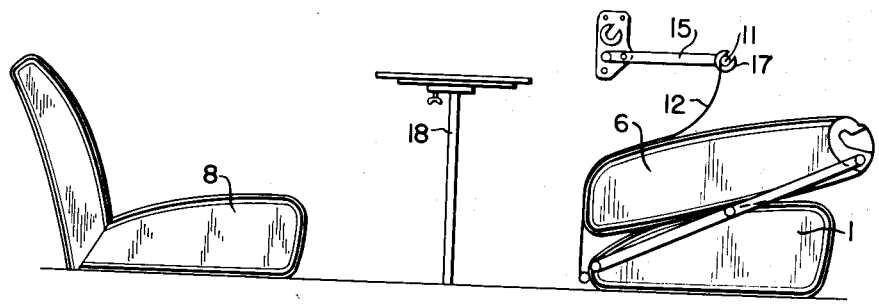
Figure 8:
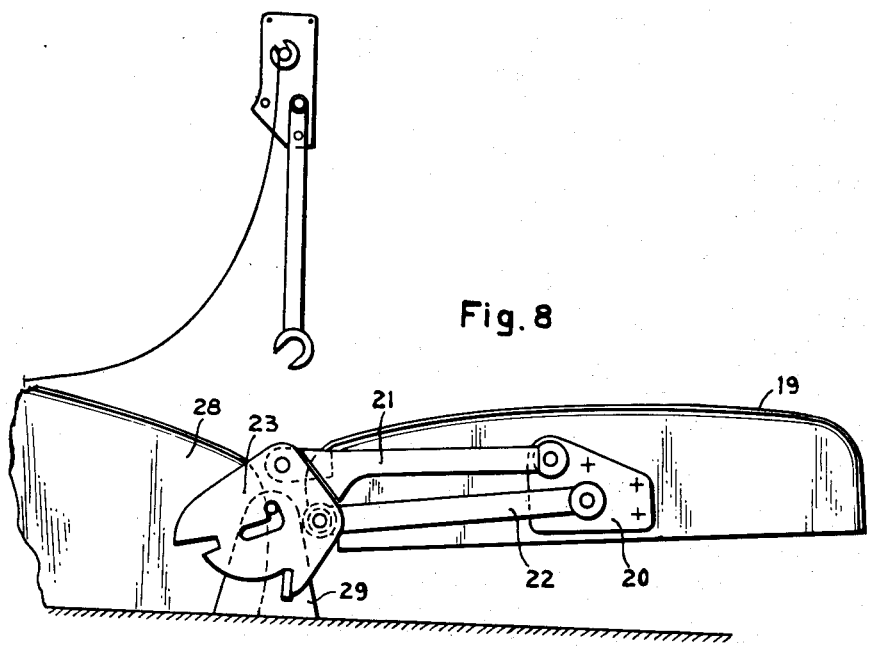

In the accompanying drawing examples of execution of the object of the invention are illustrated, where:

Fig. 1 shows the front seat with the back in normal position with a first form of execution of the fixing device, Fig. 2 the seat-back turned over towards the rear, Fig. 3 the seat-back laid over to the rear in another manner, together with a substitute back for the seat, Fig. 4 the seat-back turned over to the front, together with a table, Fig. 5 the front seat with its back in normal position together with a second form of execution of the fixing device, Fig. 6 a section through the fixing device on the line VI—VI in Fig. 5, Fig. 7 a section through the fixing device on the line VII—VII in Fig. 5, Fig. 7a a view of the part according to Fig. 7, Fig. 8 the seat-back laid over to the rear, and Fig. 9 the seat-back laid over onto the front seat.

On the front seat (Fig. 1) and at each side of it, on a bolt 2 an arm 3 of a hinge is fixed, the other arm 4 of which is fixed to a bolt 5 on the seat-back 6. On the back 6 a tooth-like fixing member 7 is arranged which can be brought into engagement with the bolt 2 on the front seat and which serves to hold the back 6 in its normal position. The member 7 engages the stop 7' in this position.

By raising the back 6, the members 7 can be brought out of engagement with the bolts 2, and the back is then free to be used for other purposes.

In Fig. 2 the back 6 is shown laid into the space between the front seat 1 and the rear seat 8. In this way a resting-place is provided extending over the whole length of the two seats. In the case illustrated, the back 6 is laid over so that its rear side lies upwards.

The back may, however, also be laid over so that its front side lies upwards, as illustrated in Fig. 3.

In order that the necessary support for the driver's back may be present to enable him to steer the car when the seat-back is completely laid over, a substitute seat-back is provided. This consists of one or more attaching means 9 fitted on the two middle posts of the car, the means 9 having a bushing 10 which is open at the top so that a cross bar 11 can be inserted. To this cross bar 11 a length of fabric 12 is fixed, the lower end of which can be fixed to the front seat 1, or hung over it.

In this way the driver has the possibility of leaning back, and then the seat beside the driver may be adapted for lying down, or for sitting, and in the latter case may have an analogous length of fabric to support the person's back. The latter arrangement may be preferable when resting-places have to be provided for children and the whole length available for lying down is not required.

The attaching means 9 is provided with an arm 15, which can swing to the front around the pivot 14 and be firmly clamped in different positions by a clamping screw 16. The arm 15 is provided at its free end with an opening 17 for taking the cross bar 11.

Instead of the attaching means 9, one or more openings can be provided in pairs on the sides of the car into which openings a telescopically extendable cross bar 11 can be inserted.

In Fig. 4 the seat-back 6 is laid over into the front seat 1 where it is held firmly in position by the hinge arms 3, 4. In this position, the seat-back 6 can serve as a raised seat and make it possible to sit at a table 18, detachably fitted in the car.

In order to give the person seated on the seat-back an opportunity to lean back, the arm 15 can be swung to the front and clamped at a suitable height. The cross bar 11 is then laid into the opening 17 and the length of fabric is fixed to the rear part of the front seat 1 so that it can serve as a support for the person's back.

In the form of construction shown in Figures 5–9 the seat part 28 of the vehicle seat is fixed to the floor of the vehicle. Each side of the part 28 is provided with a side plate 29 which is connected by means of a pivot pin or bolt 30 to a partly circular portion or pivot plate 23. A latch 34, arranged on the side plate 29, extends into the path of the pivot plate 23 forming a stop means if one of the pivot plate recesses 32, 33 is engaged with the latch 34, as shown in Figure 5. The center of the partly circular portion or pivot plate 23 is provided with a slot 31 comprising two parts 31', 31", extending in different directions; the pivot pin or bolt 30 extends through the slot 31 of the partly circular plate 23 to secure pivotally the plate 23 to the side plate 29 of the seat part 28. To disengage the partly circular plate 23 from the latch 34, the plate 23 slides in a position in which the pivot pin or bolt 30 corresponds to the lowest part of the slot 31. In this position the partly circular plate 31 can be pivoted freely about the pin 30.

A first latch means or bar 22 is pivotally engaged with the partly circular plate 23 by means of a transverse rod 26 extending through the inner part of the seat back 19. By means of threaded pins or bolts 27 arranged at the outer ends of the transverse rod 26, the rod 26 is secured against axial displacement. The free end of the latch means 22 is pivotally connected to a fixed plate 20 arranged on the side part of the back part by means of threaded bolts and nuts 20', 20''.

The second latch means or bar 21 is pivotally connected to the partly circular plate 23 by means of a threaded pin or nut 25 and a connecting part 24. The part 24 comprises a flat iron or similar piece and is welded to the latch means or bar 21. The lower end of the latch means 21 comprises an extension 35 corresponding in the normal position shown in Figure 5 to the upper edge 23' of the partly circular plate 23. The other end of the latch means or bar 21 is connected pivotally to the fixed plate 20 by means of a disc 40 welded to the bar 21.

The method of operation of this fixing device is as follows:

When the seat-back 19 has to be turned out of the normal position shown in Fig. 5 and laid over towards the rear between the front and rear seats as illustrated in Fig. 3, the seat-back 19 is first moved slightly forwards to bring the bolt 30 into the slot 31, and then it is raised a little so that the notch 32 comes out of reach of the stop 34. Then the seat-back 19 is folded over towards the rear until the notch 33 comes against the stop 34, as shown in Fig. 8.

When the seat-back 19 has to be laid over onto the front seat 28, i. e. brought into the position illustrated in Fig. 9, the seat-back 19 is pushed with its lower part towards the front out of the position according to Fig. 8 or, after previous raising, out of the position according to Fig. 5 and laid onto the front seat, the hinge arms moving past each other. The seat-back is held in its position by the notch 32 of the plate 23 being brought against the stop 34.

In the position according to Fig. 9 the seat-back can be adapted to sit on, as illustrated in Fig. 4.

The improvement in accordance with the present invention consequently allows the seating accommodation to be converted, partly or wholly, into resting-places, making it possible to drive the vehicle also when the resting-places have been prepared, and further makes it possible to adapt a table with seating accommodation at both sides of the table.

What I claim is:

1. In a convertible vehicle having side walls a seat part and a back part, the back part comprising a crook-shaped fixing member, a bolt arranged on the seat part, said member engaging said bolt in a normal position, a turning joint having a pair of arms pivoted to the back and to the seat part, the total length of the arms being substantially equal to the height of the seat part to allow a turning and a rear-upward movement of said part in a bed-forming position, a substitute seat-back of textile material, the front end of said substitute seat-back being secured to the front end of the first-mentioned seat part, the rear end of said substitute seat-back comprising a rod; and two supporting members arranged on the side walls of the vehicle, said rod being fixed between said two supporting members when the said seat-part is lowered in the bed-forming position.

2. In a convertible vehicle having a seat part and a back part, the back part comprising a crook-shaped fixing member, with a bolt arranged on the seat part, said member engaging said bolt in a normal position, a turning joint having a pair of arms pivoted to the back and to the seat part, the total length of the arms being substantially equal to the height of the seat part to allow a turning and a rear-upward movement of said seat part in a bed-forming position, a substitute seat back of textile material, the lower end of said substitute seat back being secured to the rear end of the first-mentioned seat part, the upper end of the said substitute seat back comprising a rod; and two supporting members, each of said supporting members comprising an arm and a pin, said arm being pivotally arranged about said pin, the free end of the arm having a notch formed therein to support the ends of the rod in different positions, said rod being fixed between said two supporting members.

3. In a convertible vehicle having a seat part and a back part, the back part having sides and a side plate arranged on said sides, the seat part comprising a partly circular portion and a side plate having a latch, said partly circular portion being pivotally connected to the side plate of said seat part and having two extensions engageable with said latch in different corresponding positions, said partly circular portion having a slot formed therein and comprising two parts extending in different directions, a pivot pin located on the side plate of the seat part and extending through said slot to secure said partly circular portion and the side plate of the seat part pivotally together, a pair of arms on each side of the seat, pivotally connected to the partly circular portion and to the side plate arranged on the sides of the back part, said arms pivoting in different vertical planes to produce forward and upward movements of the back part of the seat.

4. In a convertible vehicle having a seat part and a back part, the back part having sides and a side plate arranged on said sides, the seat part comprising a partly circular portion and a side plate having a latch, said partly circular portion being pivotally connected to the side plate of said seat part and having two extensions engageable with said latch of the side plate in different corresponding positions, said partly circular portion having a slot formed therein and comprising two parts extending in different directions, a pivot pin located on the side plate of the seat part and extending through said slot to secure said partly circular portion and the side plate of the seat part pivotally together, a pair of arms on each side of the seat, pivotally connected to the partly circular portion and to the side plate arranged on the sides of the back part, said arms pivoting in different vertical planes to produce forward and upward movements of the back part of the seat, one of the pivoting arms comprising an extension corresponding in the normal position to an edge of said partly circular portion, to secure the back part in this position.

5. In a convertible vehicle having side walls a seat part and a back part, the back part having sides and a side plate arranged on said sides, the seat part comprising a partly circular portion, and a side plate having a latch, said partly circular portion being pivotally connected to the side plate of said seat part and having two extensions engageable with said latch of the side plate in different corresponding positions, said partly circular portion having a slot formed therein and comprising two parts extending in different directions, a pivot pin located on the side plate of the seat part and extending through said slot to secure said partly circular portion and the side plate of the seat part pivotally together, a pair of arms on each side of the seat, pivotally connected to the partly circular portion and to the side plate arranged on the sides of the back part, said arms pivoting in different vertical planes to produce forward and upward movements of the back part of the seat, a substitute seat back of textile material, the front end of said substitute seat back being secured to the front end of said seat part, said substitute seat back comprising a rod and two supporting members arranged on the side walls of the vehicle, said rod being fixed between said members when said seat part is lowered in the bed-forming position.

6. In a convertible vehicle having a seat part and a back part, a member connected to one of said parts, two arms, means pivotally interconnecting two adjacent ends of said arms remote from said member, the opposite end of one of said arms being connected to said member, fixed latch means adjacent said seat, and engaging means on said member maintaining said parts in a predetermined position relatively to each other when engaged by said latch means.

References Cited in the file of this patent

UNITED STATES PATENTS

| | | |
|---|---|---|
| 417,192 | Knapp | Dec. 10, 1889 |
| 449,365 | Hutton et al. | Mar. 31, 1891 |
| 1,236,022 | Vaughn | Aug. 7, 1917 |
| 1,236,388 | Anderson | Aug. 14, 1917 |
| 1,501,786 | Kugler et al. | July 15, 1924 |
| 1,633,476 | Collier | June 21, 1927 |
| 1,921,325 | Richardson | Aug. 8, 1933 |
| 1,952,376 | Knabusch et al. | Mar. 27, 1934 |
| 2,094,410 | Redding | Sept. 28, 1937 |
| 2,444,230 | Miller | June 29, 1948 |
| 2,543,167 | Hening et al. | Feb. 27, 1951 |
| 2,621,339 | Little | Dec. 16, 1952 |
| 2,627,613 | Lund | Feb. 10, 1953 |

FOREIGN PATENTS

| | | |
|---|---|---|
| 64,402 | Norway | Feb. 2, 1942 |